US012680339B2

(12) United States Patent
Moon et al.

(10) Patent No.: US 12,680,339 B2
(45) Date of Patent: Jul. 14, 2026

(54) MORTISE LOCK RESISTANT TO BLUNT FORCE ATTACKS

(71) Applicant: Townsteel, Inc., City of Industry, CA (US)

(72) Inventors: Charles W Moon, Colorado Springs, CO (US); Chad P. Moon, Colorado Springs, CO (US)

(73) Assignee: Townsteel Inc., City of Industry (CA)

( * ) Notice: Subject to any disclaimer, the term of this patent is extended or adjusted under 35 U.S.C. 154(b) by 303 days.

(21) Appl. No.: 17/878,841

(22) Filed: Aug. 1, 2022

(65) Prior Publication Data

US 2023/0081964 A1 Mar. 16, 2023

Related U.S. Application Data

(60) Provisional application No. 63/228,090, filed on Jul. 31, 2021.

(51) Int. Cl.
*E05B 17/20* (2006.01)
*E05B 63/08* (2006.01)

(52) U.S. Cl.
CPC .......... *E05B 17/2053* (2013.01); *E05B 63/08* (2013.01)

(58) Field of Classification Search
CPC ........ E05B 63/08; E05B 63/12; E05B 63/122; E05B 63/127; E05B 17/2053
See application file for complete search history.

(56) References Cited

U.S. PATENT DOCUMENTS

| | | | | |
|---|---|---|---|---|
| 3,175,376 A * | 3/1965 | Cantwell | E05B 17/042 70/145 |
| 3,582,119 A * | 6/1971 | Woodworth | E05B 63/127 292/29 |
| 4,566,725 A * | 1/1986 | Klein | E05B 63/127 292/191 |
| 2014/0075728 A1* | 3/2014 | George | E05B 63/0065 29/401.1 |
| 2021/0054663 A1* | 2/2021 | Cheng | E05B 63/12 |

FOREIGN PATENT DOCUMENTS

| | | |
|---|---|---|
| CN | 201891315 U | 7/2011 |
| KR | 100581735 B1 | 5/2006 |
| KR | 20-0467764 | 7/2013 |

* cited by examiner

*Primary Examiner* — Christine M Mills
*Assistant Examiner* — Yahya Sidky
(74) *Attorney, Agent, or Firm* — Eric W. Cernyar; Huffman Law Group, PC

(57) ABSTRACT

A mortise lockset for a sliding door or double door includes adaptations to make it more resistant to blunt-force attacks. The lockset includes retractable locking hooks, tabs or catches that extend above and below a bolt to securely lock the door. The mechanism, which uses no springs to bias the catches, cams the catches to varying positions as the bolt travels between its retracted and projected positions. Pivotally mounted levers incorporating or carrying the catches include a contoured edge that cams upon cam posts to drive the catches between withdrawn and lockingly engaged positions into or from the bolt. The lockset also includes a channel shaped to cause the thumbturn tail to obstruct retraction caused by blunt forces exerted on the door or doorframe itself, proximate to the bolt.

20 Claims, 7 Drawing Sheets

MORTISE LOCK RESISTANT TO BLUNT FORCE ATTACKS

CROSS REFERENCE TO RELATED APPLICATIONS

This application claims the benefit of U.S. Provisional Patent App. No. 63/228,090, filed Jul. 31, 2021, which is herein incorporated by reference.

FIELD OF THE INVENTION

This application relates generally to mortise locksets, and more particularly to bolts that incorporate retractable hooks.

BACKGROUND

There is a need in the art for mortise locks that are resistant to attacks. In a typical mortise lock, a latch bolt is driven through the aperture of the strike plate and into the door frame. Such locks are susceptible to severe impact forces, which can deform the bolt and strike plate, enabling entry.

One method of making mortise locks more impact-resistant is to incorporate one or more hooks into the bolt. For example, U.S. Pat. No. 4,958,508 introduces a lock with two pivoting bolts that pivot. Each bolt pivots from a withdrawn position inside the mortise to a projected position that curves down over the strike plate. Firmly connecting the bolt to the strike plate makes it more difficult to defeat through force.

In another design, hooks are withdrawn within the bolt itself. They are made to project out of the top and bottom of the bolt. Springs, which can weaken over time, are used to bias the hooks into a projected position. For example, Korea Patent No. KR100581735B1 to Dongkwang Alpha, entitled "Deadbolt Locking Structure of Electronic Door Lock," Depends on the use of a spring, which can weaken with wear. In Chinese Patent No. CN201891315U to Yongkang City Qihao Lock Co. Ltd., entitled "A tamper-proof door with hook and tongue," a spring is also employed to urge some part of the bolt and hook assembly.

SUMMARY

The embodiments described in this section are based off the claims and present different ways of characterizing the invention. Not all of the elements described below are essential to the invention, and there exist multiple other ways of characterizing the invention.

One embodiment of a lockset is provided comprising a lockset body, a bolt, and a locking hook, tab, ear or catch (where "catch" is a catch-all for all substantially and functionally equivalent forms) formed in or mounted to a hook or tab body. A slot is provided in the bolt to house the hook or tab and/or hook or tab body. In some embodiments—such as those which pivotally mount the body—the hook or tab body can be more simply referred to as a lever, as is done in some parts of the specification. Inside the slot, the hook or tab body is pivotally mounted to a pivot pin or post. The pivot pin or post constrains the hook or tab to move between withdrawn (i.e., retracted within the slot) and lockingly engaged positions. In the lockingly engaged position, the hook or tab is at least partially projected out of the slot and into a corresponding recess of the bolt hole in the doorframe or other double door.

The contoured edge of the hook or lock body and how it is positioned to move by and against a stationary cam post causes the locking hook or tab—in conjunction with the bolt as it is projecting—to extend out of the slot at a top, bottom, or left or right side of the bolt. The relationship between the contoured edge and the cam post also causes the locking hook or tab to retract into the slot far enough to clear the bottom edges of a strike plate aperture and a scalp plate aperture.

This embodiment is best suited for mortise locksets but could be adapted to other locksets. Several other non-essential features are described below.

In one implementation, the hook or tab body is pivotally mounted to the bolt. A pivot pin is inserted through the bolt and travels with the bolt. In contrast with the pivot pin, at least one stationary post is mounted within the mortise body that is stationary with respect to the mortise body.

In addition, the hook or tab body has an edge, and the edge has a curvingly contoured section that cams against the stationary post to lift and lower the hook or tab body between a withdrawn position where the locking hook or tab is withdrawn into the bolt slot and a lockingly engaged position in which the locking hook or tab extends out of the bolt slot.

In another implementation, the lockset further comprises a retract slide, thumbturn, lever extension or tail, and channel formed int the retract slide into which the lever extension or tail of the thumbturn is placed. The retract slide carries the bolt between the retracted and projected positions. The thumbturn, when operated, forces the retract slide to move into the projected position to lock a door in which the lockset is installed, or to move into the retracted position to unlock the door. The lever extension or tail of the thumbturn couples the thumbturn to the retract slide. When the bolt is fully projected, the thumbturn lever extension or tail is placed in opposition to a forward side of the channel. When an attempt is made to card the lockset, the thumbturn lever extension or tail resists the attempt by counteracting pressure from the forward side of the channel to the thumbturn tail.

The channel may be approximately V-shaped. More specifically, the channel comprises channel sides that, starting from the top of the channel and progressing toward the bottom of the channel, begin to converge, but then turn outwardly in a diverging direction. At their closest points to each other, the two sides are still displaced enough to receive the bottom of the tail of the thumbturn. When an impact force is applied to the lockset, the bottom of the tail of the thumbturn acts like a stopper, preventing the retract slide from retracting. But there is no obstacle preventing operation of the thumbturn to retract the retract slide.

In a second embodiment, a lockset is provided for a sliding door or a double door. The lockset comprises a lock body with a cam post and a scalp plate, a bolt movable between retracted and projected positions, a hook or tab or tab incorporated into or mounted to a hook or tab or tab body, and a curvingly contoured edge section of the hook or tab or tab body. The hook or tab or tab body is housed within the bolt. When the bolt approaches a projected position, the hook or tab or tab body automatically extends out of the bolt to lockingly engage a door frame or an opposite door of a sliding double door.

The contoured edge section of the hook or tab or tab body comprises first and second convex sections and first and second camming contacts on the first and second convex sections, respectively. The first convex section cams against the cam post when the bolt is approaching the projected position, forcing the hook or tab into locking engagement with the door frame or opposite door. The second convex section cams against the cam post when the bolt is just beginning to retract from the projected position, forcing a withdrawal of the hooks or tabs from their lockingly engaged position.

In one implementation, the hook or tab body further comprises a recessed linear section of the hook or tab body that is long enough to bridge both the scalp plate and a strike plate when the bolt is in the projected position and deep enough to enable the hook or tab to lockingly engage a doorframe or an opposite door of a double door.

In another implementation, the hook or tab body further comprises a glide edge on the hook or tab. As the bolt retracts, contact between the second convex section of the edge contour and the cam post ceases, but contact between the glide edge and a lower edge of a bolt aperture of the scalp plate and a strike plate keeps the hook or tab in a withdrawn position.

In a third embodiment, a mortise lockset is provided for a sliding door or a double door. The mortise lockset comprises a mortise body, a thumbturn, a retract slide and bolt assembly operatively connected to the thumbturn, and a cam post. The retract slide and bolt assembly comprises a retract slide, a bolt carrier, a bolt with a slot, and a hook or tab body. The hook or tab body comprises a locking hook or tab, a pivot post or pivot hole, and a hook or tab body edge.

The locking hook or tab is configured for movement between an inactive position withdrawn within the bolt slot and an active position extended out of the bolt slot and into a complementary aperture of a door frame or of a second door.

The pivot post or pivot hole enables cam-forced pivoting of the hook or tab body with respect to the bolt and/or bolt carrier. The hook or tab body edge that has a contour for camming against the cam post. Such camming retracting the hook or tab as the bolt retracts or projects enables the hook or tab to clear a strike plate of the door frame or second door.

In one implementation, the hook or tab body is not spring biased into a withdrawn or extended position with respect to the bolt. Movement of the hook or tab between the withdrawn and extended positions is primarily caused by the camming action of the hook or tab body edge with the cam post as the bolt is retracted or projected. The movement of the thumbturn or a key is a secondary cause of the hook's or tab's movement between retracted and extended positions.

At a deeper level of detail, the hook or tab body edge comprises a first convex camming contact region that is configured to cam against the cam post as the bolt, when fully projected, begins to be retracted. This creates a camming action that lifts the hook or tab up into a withdrawn position within the bolt, clearing the strike plate.

Moreover, the hook or tab body edge comprises a second convex camming contact region. This second convex camming contact region cams against the cam post when the bolt is moving toward a projected position and after it has cleared the strike plate. This maintains the hook or tab in a withdrawn position with respect to the bolt until the bolt has extended far enough to engage a complementary bolt receptacle in a door frame or second door prepared for receiving the extended hook or tab.

Incidentally, the span of the hook or tab body edge between the first and second convex camming contact regions may be concave.

In addition to the first and second convex camming contact regions, the hook or tab body edge comprises a recess and a glide edge. The recess extends far enough to span the scalp plate of the mortise lock and the strike plate of a door frame or second door when the door or doors are closed. The glide edge is configured to ride across a lower edge of the scalp plate of the mortise lock at least part of the travel of the bolt between retracted and projected positions.

Movement of the bolt between retracted and projected positions defines a travel profile for a rearmost glide section point. The travel profile, viewed from a transition from a retracted bolt to a projected bolt, comprises a substantially linear first section, a substantially linear second section elevated above the first section, and a third section that descends from the second section.

A first section of the travel profile delineates the position of the rearmost glide edge point as the bolt travels from a position at or proximate its most retracted position to a position in which a leading glide edge point is proximate to the strike plate of a door frame or corresponding double door. A second section of the travel profile corresponds to the position of the rearmost glide edge point as the bolt traverses the strike plate of the door frame or corresponding double door.

The travel profile may also include a curved fourth section intermediate the first and second sections reflecting the camming action of the hook or tab body's profile edge against the cam post to raise the hook or tab body farther up into the bolt slot to ensure that the bolt clears the strike plate as the bolt continues to travel toward a completed extended position.

A third section of the travel profile is an elliptical section whose downward steepness illustrates the sharp downward turn that the hook or tab makes very shortly after the rearmost glide edge point clears the strikeplate.

Other systems, devices, methods, features, and advantages of the disclosed product, kits, and methods for forming or preparing a mortise lockset and preparing a doorframe or door to receive the bolt and hooks or tabs of a mortise lockset and parts of locksets will be apparent or will become apparent to one with skill in the art upon examination of the following figures and detailed description. All such additional systems, devices, methods, features, and advantages are intended to be included within the description and to be protected by the accompanying claims.

BRIEF DESCRIPTION OF THE DRAWINGS

The present disclosure may be better understood with reference to the following figures. Corresponding reference numerals designate corresponding parts throughout the figures, and components in the figures are not necessarily to scale.

It will be appreciated that the drawings are provided for illustrative purposes and that the invention is not limited to the illustrated embodiment. For clarity and in order to emphasize certain features, not all of the drawings depict all of the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, it should be understood that there is no restrictive one-to-one correspondence between any given embodiment of the invention and any of the drawings

DESCRIPTION

Figure 2:
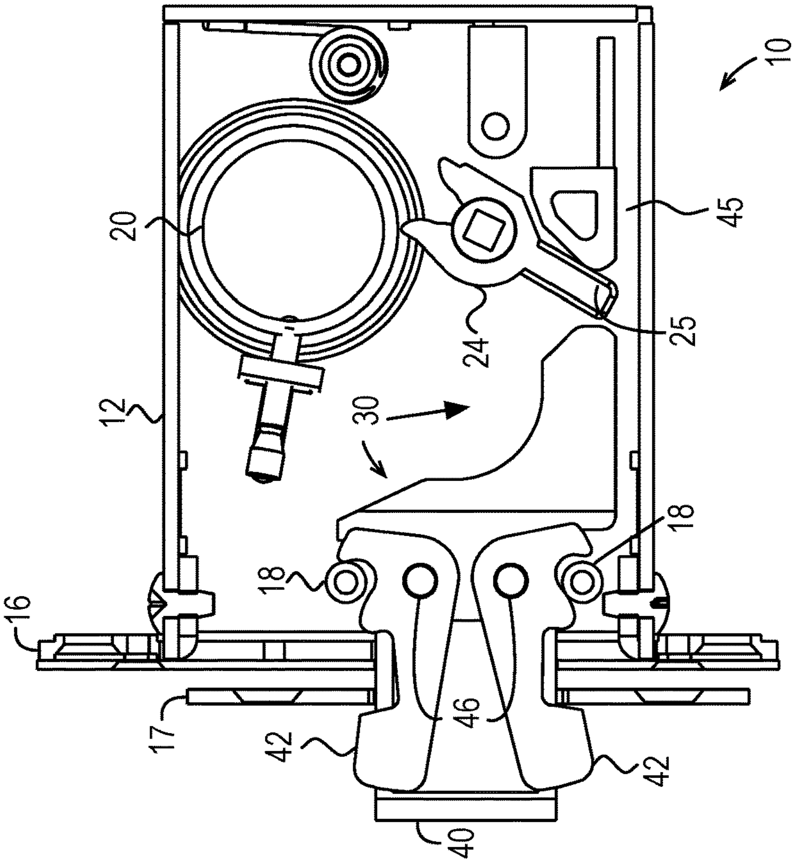
FIG. 2 is an opposite cross-sectional view of the embodiment of FIG. 1.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities, dimensions, spatial characteristics, compositional characteristics and performance characteristics may be used explicitly or implicitly herein, but such specific quantities are presented as examples only and are approximate values unless otherwise indicated. Discussions and depictions pertaining to these, if present, are presented as examples only and do not limit the applicability of other characteristics, unless otherwise indicated.

In describing preferred and alternate embodiments of the technology described herein, as illustrated in FIGS. 1-17, specific terminology is employed for the sake of clarity. The technology described herein, however, is not intended to be limited to the specific terminology so selected, and it is to be understood that each specific element includes all technical equivalents that operate in a similar manner to accomplish similar functions. Furthermore, there are instances in which two alternate terms—such as "hook" and "tab"—are used to describe an element. These terms are not exclusive, but rather overlap each other. There are many hooks that may alternately be described as tabs and vice-versa. While some common definitions of "hook" recite a curved form, other definitions acknowledge that hooks can have angular forms instead of curved forms. Therefore, the term "hook" should be understood to encompass both curved and angular forms. The term "tab" extends the scope to include right-angled forms and overlaps the word "hook" in that both words also cover angled and curved forms. The term "catch" further extends the scope to any element that extends out of the bolt and resists retraction caused by blunt force.

FIGS. 1-16 illustrate a new and improved mortise lockset 10 and, in particular, a new and improved bolt and hook action for the mortise lockset 10. The mortise lockset 10 comprises a mortise lock housing 12, a mortise lock cylinder 20, a thumbturn 24, a retract slide and bolt assembly 30, a scalp plate 16, and a stationary camming post 18. The mortise lockset 10 may also incorporate other components that may be familiar to ordinarily skilled artisans. The bolt 40 features hooks 42 (which can be referred to by a variety of other names, including tabs, ears, catches) that extend out of the top 48 and bottom 49 (or alternately, the sides) when the bolt 40 is fully projected. The hook or tab bodies 41, which are levers, are assembled to the bolt by means of standoffs 46. The standoffs 46 act as pivot pins, allowing the hook or tab bodies 41 to pivot with respect to the retract slide and bolt assembly 30. The standoffs/pivot pins 46 travel with the retract slide and bolt assembly 30 as the bolt 40 is driven between retracted and extended positions. As the retract slide and bolt assembly 30 transits between the retracted and extended positions, stationary camming posts 18 and specially configured contoured hook or tab body edge section 43 interact to cam the hook or tab bodies 41 between various pivot angles in a smooth, choreographed movement that clears the scalp 16 and strike plates 17 and forcefully extends the tabs 42 when the bolt 40 is extended.

Figure 9:
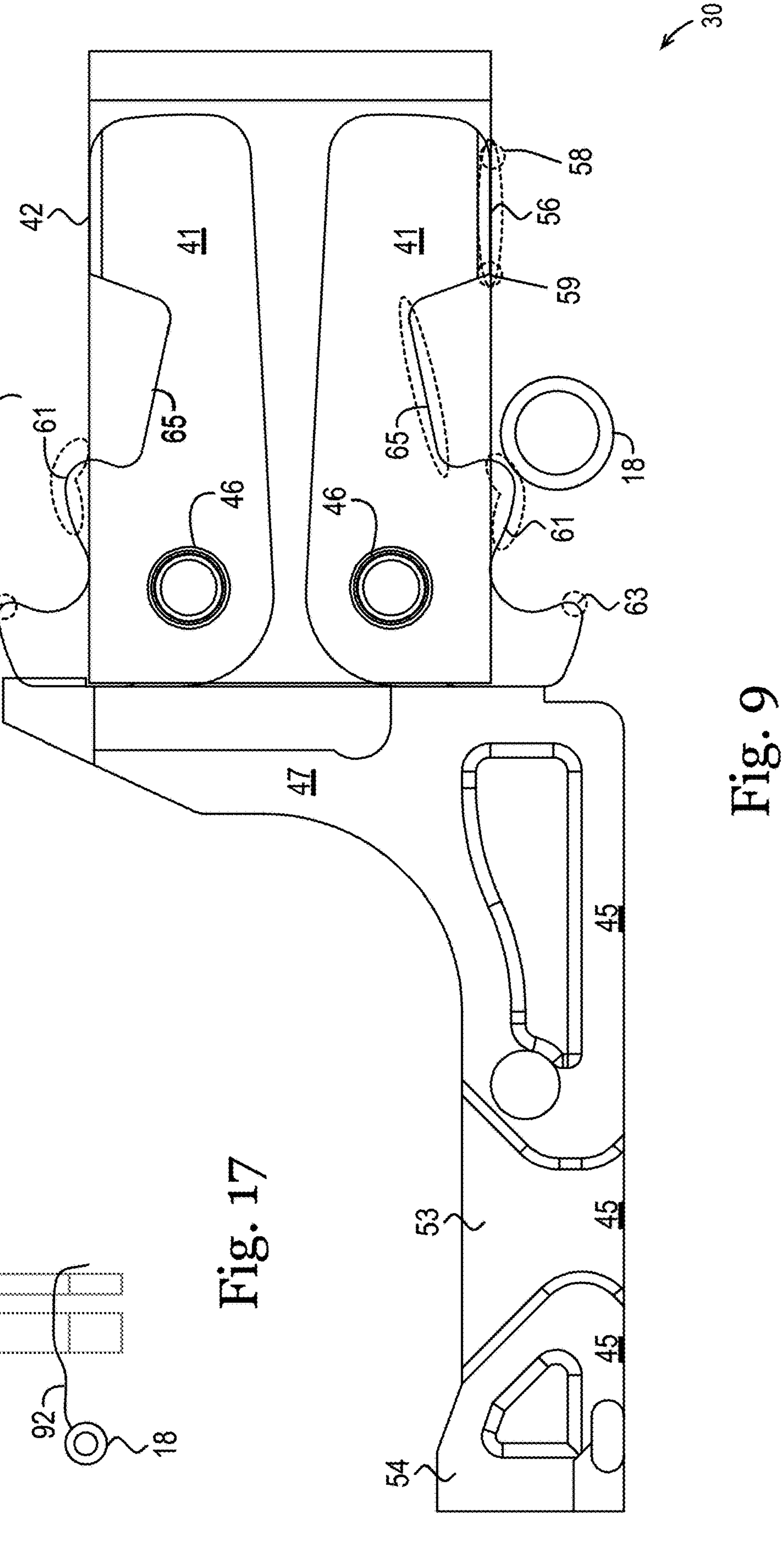
FIG. 9 is a close-up view of the retract slide and bolt assembly of FIG. 1, illustrating a hook or tab body with an edge profile.

FIGS. 1-8 illustrate the movement of the retract slide and bolt assembly 30 as well as the thumbturn 24 as the bolt 40 is retracted from a fully projected position (or, if viewed in backward order, as the bolt 40 is projected from a fully retracted position). FIGS. 10-13 do the same thing in the opposite order, enlarging the hook or tab bodies 41 of FIGS. 2, 4, 6 and 8 so that one can more clearly follow the interaction between a contoured section of hook or tab body edge 43 and the stationary cam posts 18. FIG. 9 enlarges the hook or tab bodies 41 even more so that it is possible to call out different sections of the contoured hook or tab body edge section 43. These drawings are intended to provide the reader with a frame-by-frame understanding (albeit with only four frames) of the choreographed, cam-guided movement of the hooks or tabs 42 as the bolt 40 travels between its two limits.

Figure 10:
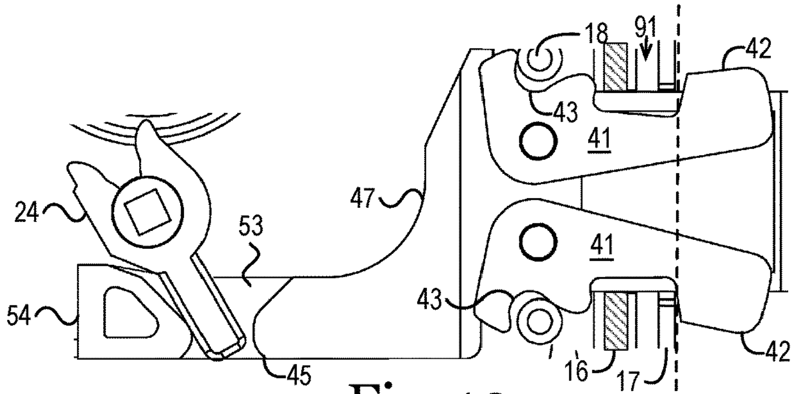
FIGS. 10-13 are close-up views the retract slide and bolt assembly of FIG. 1 illustrating the interaction between a contoured hook or tab body edge and stationary camming posts as the bolt is moved from a fully projected position to a completely retracted position.
Figure 14:
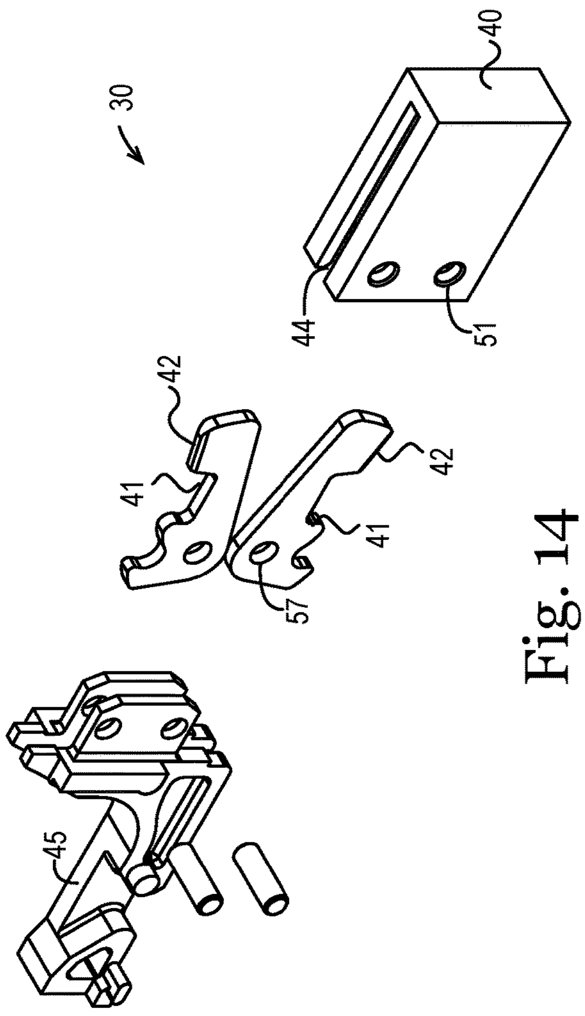
FIG. 14 is an exploded perspective view of the retract slide and bolt assembly.
Figure 16:
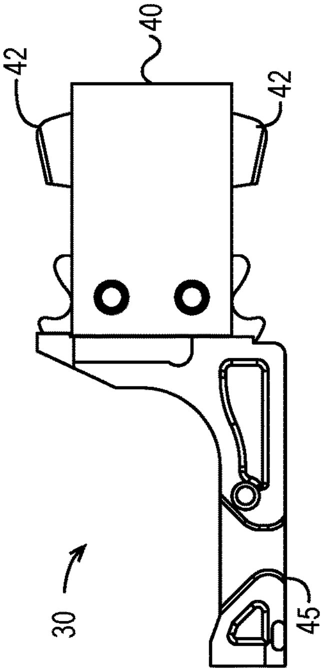
FIG. 16 is a plan view of the assembled retract slide and bolt assembly, with the hooks or tabs extended out of the bolt.
Figure 15:
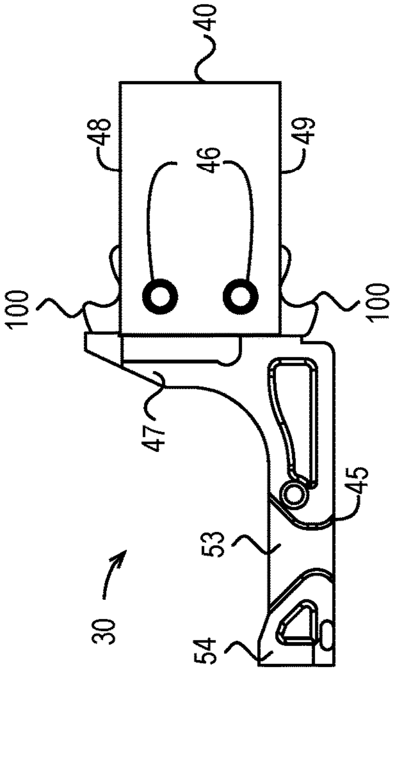
FIG. 15 is a plan view of the assembled retract slide and bolt assembly, with the hook or tabs withdrawn into the bolt.

FIGS. 14-16 illustrate the components of the retract slide and bolt assembly 30. The bolt 40 features a slot 44 into which bottom and top hook or tab bodies 41 (alternately referred to as hook or tab carriers) are inserted and pivotally connected to the bolt 40 or bolt carrier 47. Each hook or tab body 41 incorporates a pivot pin 46 or hole 57 for pivotally mounting the hook or tab body 41 to the bolt 40 or bolt carrier 47. Each hook or tab body 41 also incorporates a locking hook or tab 42 that pivots between a withdrawn-in-bolt position (FIG. 13) and an extended-from-bolt position (FIG. 10). The mortise lock 10 is meant to be installed in sliding doors whose door frames feature a bolt receptacle (also referred to as a strike plate hole, deadbolt hole, or bolt cavity) provided through the jamb of the door frame that accommodate not only the bolt 40 itself, but also the extended locking hooks or tabs 42.

Turning now to FIG. 9, the contoured edge section 43 of the hook or tab body 21 is shown in greater detail. The contoured hook or tab body edge section 43 guides how the hook or tab body 41 is pivoted as the bolt 40 is moved between fully retracted and fully projected positions. The contoured hook or tab body edge section 43 is at least partially curved and in the implementation shown, includes a curved section resembling an "S," with a concavity arranged adjacent along a directrix-like axis ("like" because the concavity might not be parabolic or have a single point of focus and the axis need not intersect the focus) to a nearly oppositely facing convexity sharing the same axis.

The curvacious contoured hook or tab body edge section section 43 includes a first camming contact region 61 configured to interact with a stationary cam post 18 and a scalp plate 16 to cause the lower hook or tab body 41 to clear the strike plate 17 as the bolt 40 is projected or retracted.

The second camming contact region 63 is also configured to interact with its respective stationary cam post 18. As the bolt 40 approaches its fully projected position, the hook or tab 42 is forced deep into the slot 44 of the bolt 40, allowing the hook or tab 42 to clear the scalp plate 16 and strike plate 17 (and the gap 91 in between) when retracting.

The first and second camming contact regions 61 and 63 are convex, and the portion of the curved section between the first and second camming contact regions 61 and 63 is concave. The curvature of the concave section facilitates smooth transitions between different pivot angles of the hook or tab body 41.

Incidentally, it is not necessary for the upper and lower hook or tab bodies 41 to be identical, because gravity suffices to cause the hook or tab 42 of the upper hook or tab body 61 to clear the strike plate 17. On the other hand, making them identical reduces installation errors because it allows the hook or tab bodies 41 to be interchangeable. Moreover, it ensures that even without gravity, the hooks or tabs 42 withdraw into the slot and extend out of the slot.

The hook or tab body 41 also includes a linear edge section 65, which can alternately be referred to as "scalp and strike plate spanner" or, more simply, as a "spanner edge section." The spanner edge section 65 defines a recess in the hook or tab body 41. Without a recess, the locking hooks or tabs 42 or tabs would be blocked from projecting out of the bolt 40. This is best illustrated in FIG. 10.

The motion of the retract slide and bolt assembly 30 and the relative distance (or gap 91) between the scalp plate 16 of the mortise body and the strike plate 17 on the door frame or receiving door (if for a double door) imposes some design constraints on the contour of the hook or tab body 41. One design constraint for the hook or tab body 41 is that the spanner edge section 65 needs to span a large enough distance to bridge the scalp and strike plates 16 and 17 when the door is closed.

Figure 11:
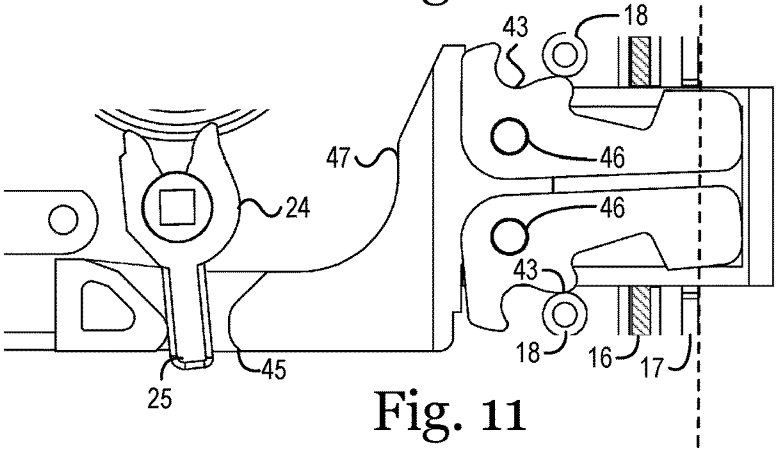
Figure 12:
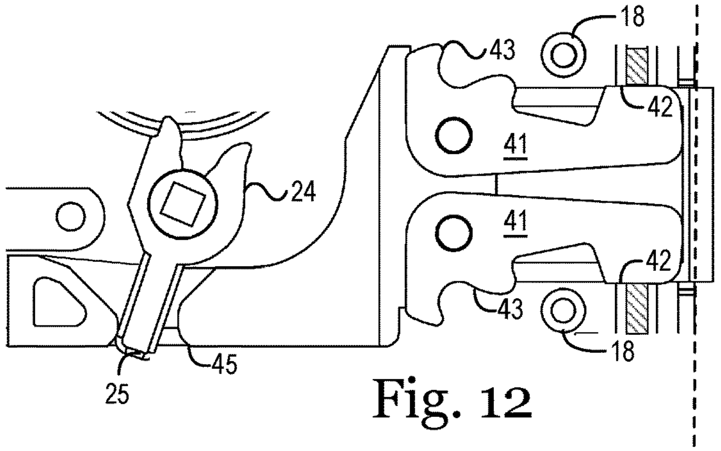
Figure 13:
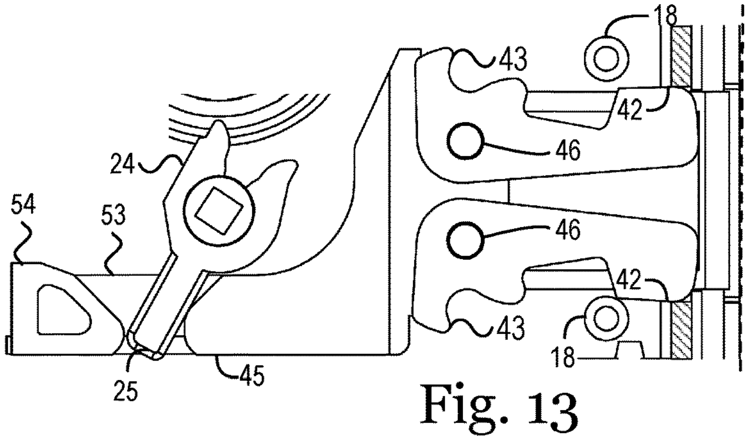

Another design constraint is that the glide edge 56 be close enough to the first camming contact region 61 to enable a "hand-off" from the first camming contact region 61 to the glide edge 56. The glide edge 56 and first camming contact region 61 are designed to hold the lower hook or tab body 41 up enough to clear the scalp plate 16. The first camming contact region 61 cannot do this singularly—that is, cause the hook or tab body 41 to clear the scalp plate 16 and strike plate 17 through the entirety of the bolt's travel between fully retracted and projected positions—because it is not wide enough. Also, the first camming contour 61 cannot be made much wider because (1) the concave first camming contact region 61 already abuts the scalp plate 16 when the bolt 40 is fully extended (FIG. 2), and (2) the spanner edge section 65 needs to maintain its minimum width. Therefore, the lower edge of the lower hook or tab body 41 is contoured so that the glide edge 56 comes into contact with the bottom edge of the bolt aperture in the scalp plate 16 when the concave first camming contact region 61 is no longer positioned to uphold the lower hook or tab 42 in a withdrawn-in-the-bolt position. The hand-off occurs between FIG. 11 and FIG. 12. In FIG. 11, the first camming contact region 61 does its part to withdraw the hook or tab 42 into the bolt 40 from the hook's or tab's fully extended position in FIG. 10. As the retract slide 45 retracts, the first camming contact region 63 loses contact with the camming post 18. In FIG. 12, a glide edge segment 56 formed on the hook or tab 42 has taken over the function of keeping the hook or tab 42 withdrawn. (Note that for the upper hook or tab body 41, gravity may be sufficient for this function).

Also, minor variations in the diameter of the cam post 18 and radii of arc sections of the contoured hook or tab body edge section 43 can have a significant impact on whether the resulting travel profile of the hook or tab 42 will successfully lock and unlock the mortise lockset 10. The existing disclosure brings to ordinarily skilled artisans sufficient guidance to the contour design that they should find it possible to make any additional modifications of parameters to make the lockset 10 function.

Figure 17:
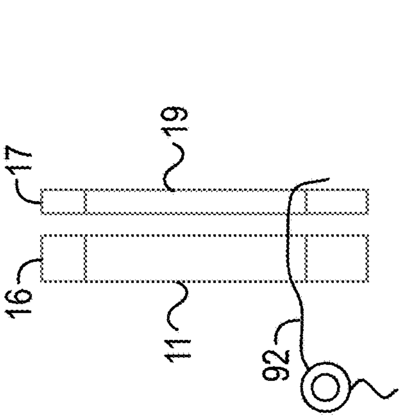
FIG. 17 illustrates a rough profile of the position of a rearmost point of a glide edge of the lower hook or tab body.

FIG. 17 sketches a trace 92 that roughly (because it is not CAD-generated) depicts the vertical position of the rearmost glide edge point 59 (FIG. 9) as a function of the position of the lower hook or tab body 41 between its fully retracted and completely projected extremes. Viewing the trace 92 from left to right represents a transition from a fully retracted position to a completely projected position for the retract slide and bolt assembly 30. The trace 92, viewed left to right, commences with a slightly positive slope (pitch) while the leading point of the glide edge segment 56 cams upward against the scalp plate 16. Once the leading point 58 of the glide edge segment 56 begins to slide, linearly, across the lower edge of the bolt aperture in the scalp plate 16, the trace 92 becomes at least somewhat linear. As the leading point 58 of the glide edge segment enters the gap 91 between the scalp and strike plates 16 and 17, camming action of the first camming section of the edge profile 43 against the cam post 18 pivots the lower hook or tab body 41 to raise its hook or tab 42 to ensure that the hook or tab 42 clears the strike plate's lower aperture edge. The camming action continues to keep the hook or tab 42 raised as the bolt 40 continues to extend. When the rearmost point 59 of the glide edge segment 56 clears the strikeplate aperture—or more precisely, clears the region where the strikeplate aperture is expected to be (within some tolerance range)—the second, sharply curved, camming section 63 of the contoured hook or tab body edge section 43 forces the hook or tab 42 downward in a steep and rapid descent. For the lower hook or tab 42, all of this motion is produced by camming, without the aid of a spring to bias the hook or tab body 41. With the upper hook or tab 42, a combination of camming and gravity (pulling the hook or tab 42 into a withdrawn position) determines the trace 92, again without the aid of a spring.

Figure 1:
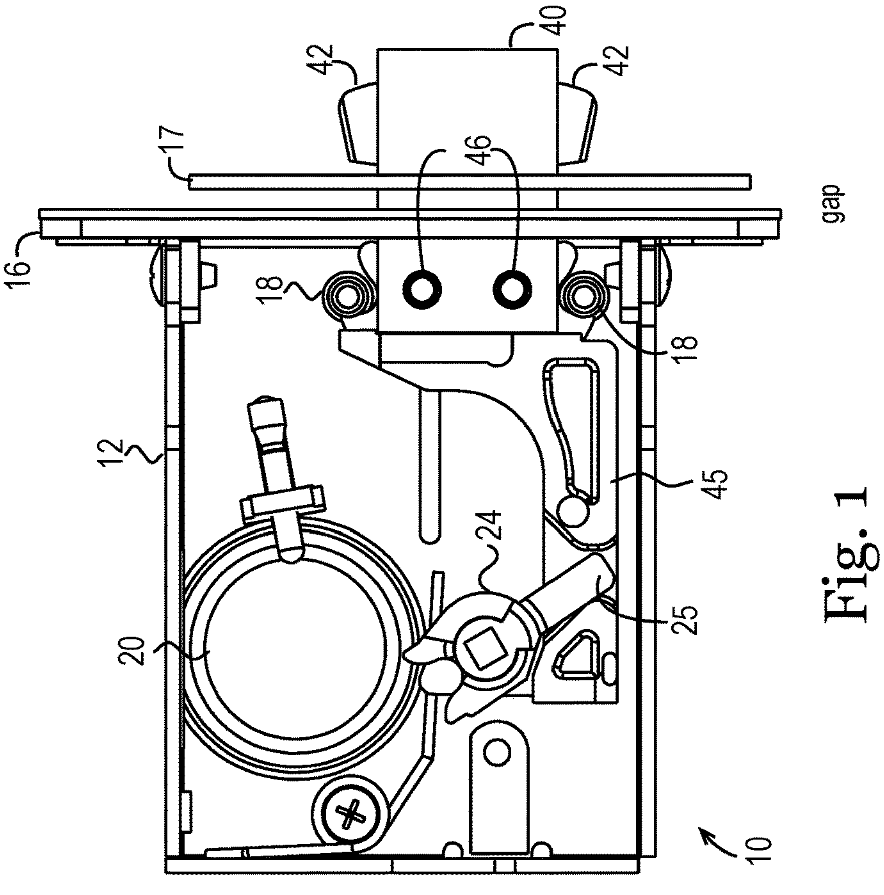
FIG. 1 is a cross-sectional view of one embodiment of a mortise lock with retractable hooks or tabs that extend out of the top and bottom sides of the fully projected bolt.
Figure 4:
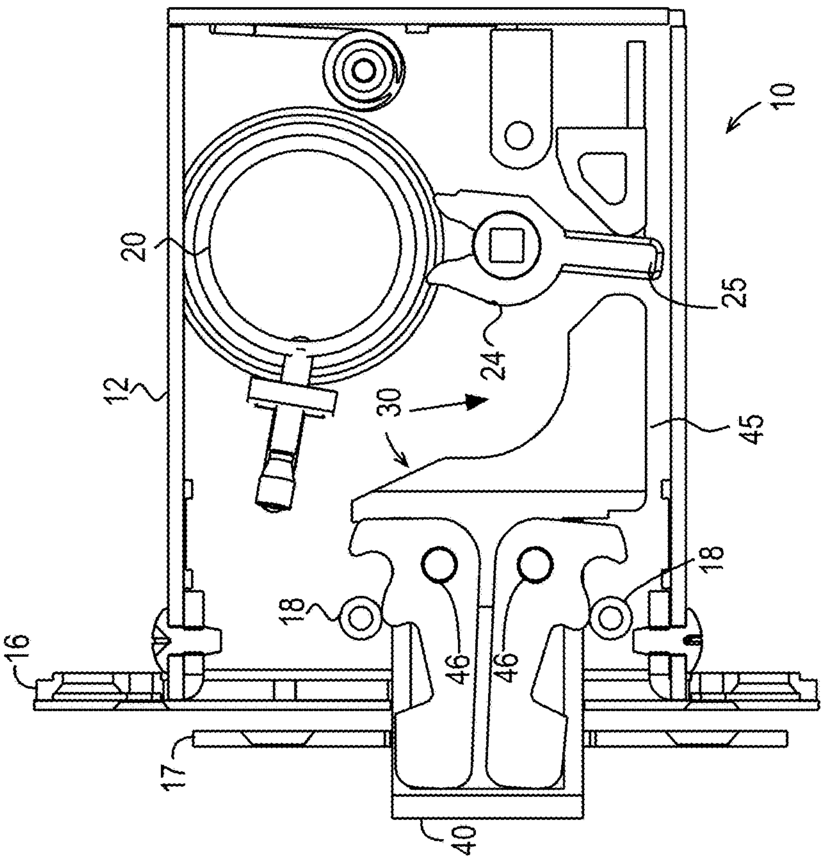
FIG. 4 is an opposite cross-sectional view of the embodiment of FIG. 3.
Figure 3:
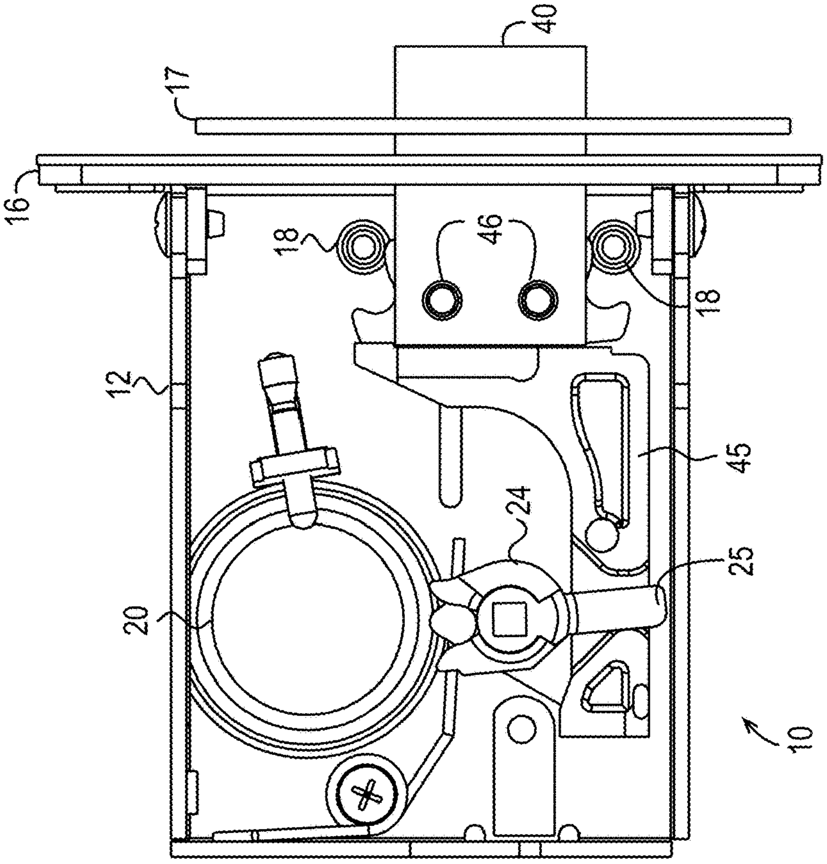
FIG. 3 is a cross-sectional view of the embodiment of FIG. 1, but with the hooks or tabs withdrawn and the bolt mostly but not completely projected.
Figure 6:
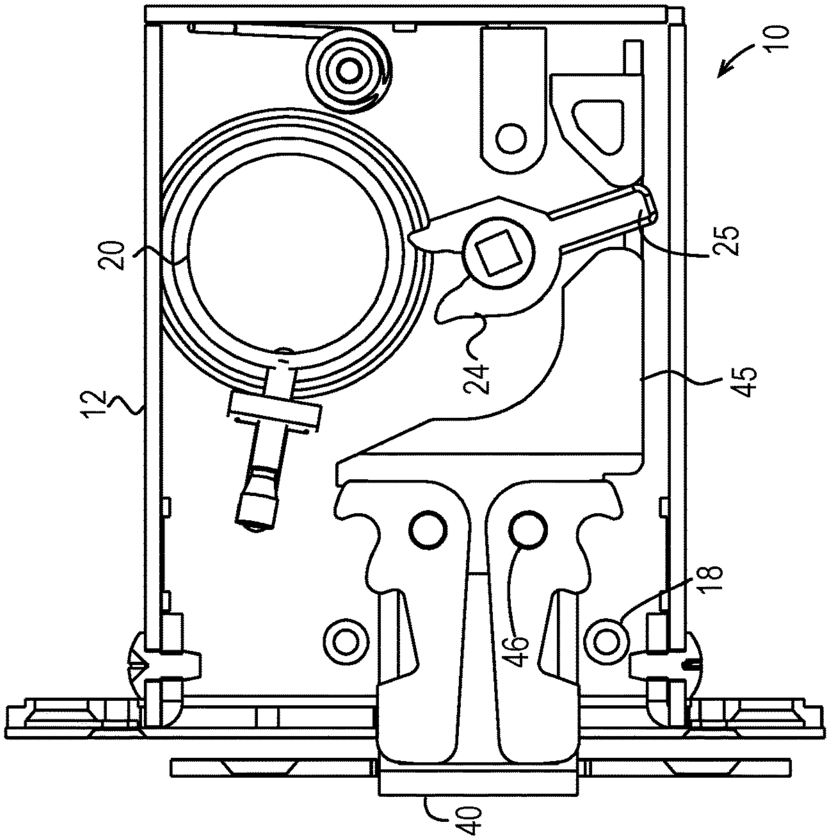
FIG. 6 is an opposite cross-sectional view of the embodiment of FIG. 5.
Figure 5:
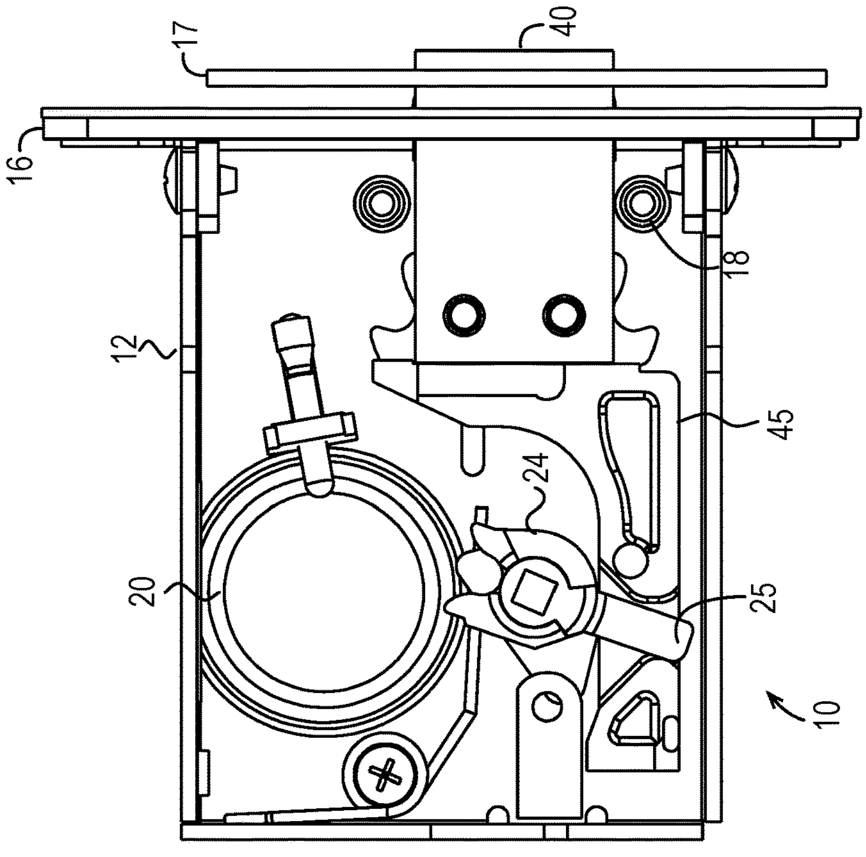
FIG. 5 is a cross-sectional view of the embodiment of FIG. 1, but with the hooks or tabs withdrawn and the bolt mostly retracted.
Figure 8:
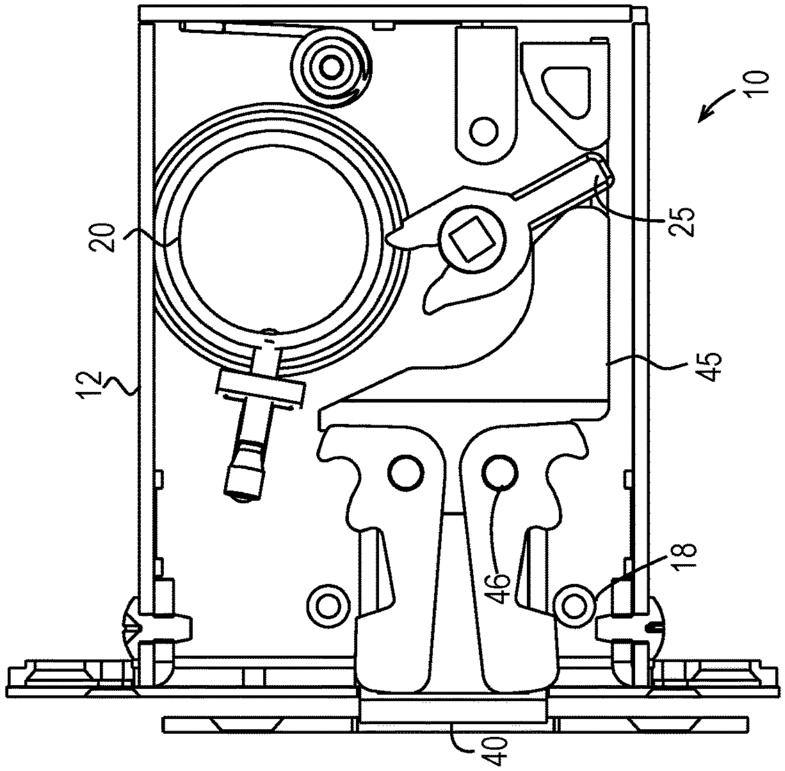
FIG. 8 is an opposite cross-sectional view of the embodiment of FIG. 7.
Figure 7:
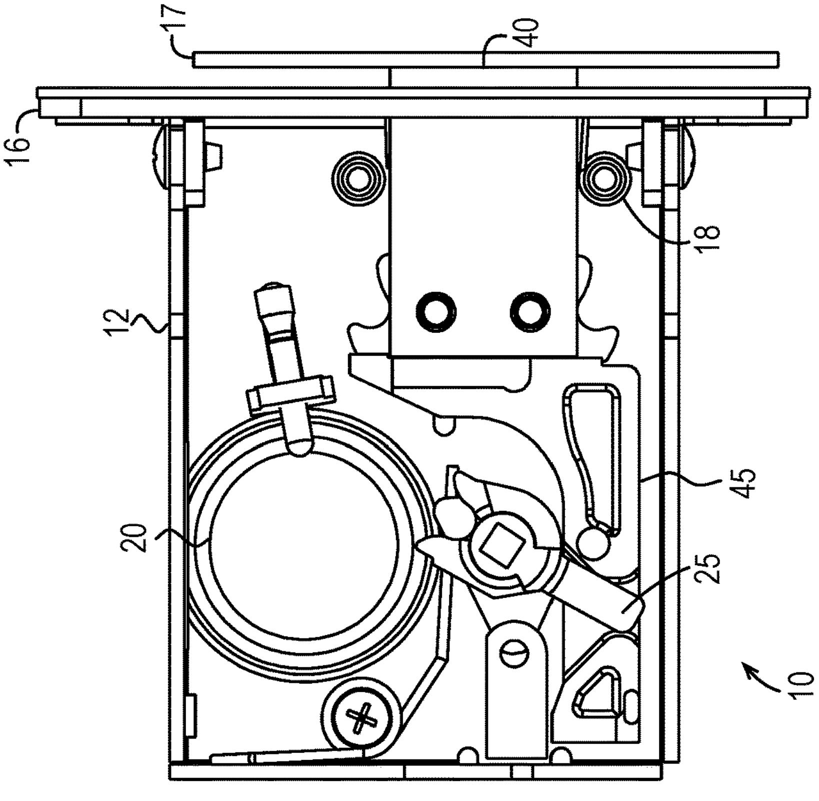
FIG. 7 is a cross-sectional view of the embodiment of FIG. 1, but with the hooks or tabs withdrawn and the bolt completely retracted into the mortise lock body.

While the emphasis of this application is on the hook or tab mechanism, it is notable that the mortise lock 10 includes a deadlocking mechanism. That mechanism includes the incorporation of a V-channel (FIG. 9) in the retract slide 45 into which a lever extension or tail 25 of the thumbturn 24 is placed. When the bolt 40 is fully projected, as shown in FIGS. 1 and 2, the thumbturn lever extension 25 is placed in opposition to a side of the V channel. An attempt to card the lock would apply pressure from that side of the V channel to the thumbturn tail 25, but for an ordinary range of pressures caused by using a card in this manner, this would fail to push the retract slide 45 back.

Corollary to the embodiment described above, the bolt hole in the door frame or other double door should be contoured to accommodate the extension of the hooks or tabs 42 out of the slots and against the inside of the mortise body adjacent the scalp plate 16.

For example, in another embodiment, hooks or tabs 42 are designed to come out of the right and left sides of the bolt 40 rather than from the top and bottom of the bolt 40. Such an embodiment features smaller hooks or tabs 42 that can fit within smaller lateral slots 44 in the bolt 40. The bolt hole in the door frame or twin sliding door would need to be cut or drilled to accommodate the hooks or tabs 42 extending out of the sides of the bolt 40.

Various electronic actuators, switches, controllers, and other devices may be employed with the sliding spindle lockset and its components. The resultant locksets may be fully or largely mechanical, electronic, or a combination thereof. Parts may be made of various materials as warranted, including metal, carbon, polymers, and composites.

It will be understood that many modifications could be made to the embodiments disclosed herein without departing from the spirit of the invention. Having thus described exemplary embodiments of the present invention, it should be noted that the disclosures contained in the drawings are exemplary only, and that various other alternatives, adaptations, and modifications may be made within the scope of the present invention. Accordingly, the present invention is not limited to the specific embodiments illustrated herein but is limited only by the following claims.

We claim:

1. A lockset comprising:

a lockset body;

a bolt constrained to move between retracted and projected positions along a bolt axis;

a slot through a bottom side of the bolt, the slot having a closed end proximal to a front face of the bolt, the front face of the bolt extending over the closed end of the slot, and the slot extending backwardly from the front face of the bolt in a direction parallel to the bolt axis;

at least one lever housed within the bolt slot; and a locking catch formed in or mounted to the lever;

a retract slide that carries the bolt between the retracted and projected positions;

a thumbturn that, when operated, forces the retract slide to move into the projected position to lock a door in which the lockset is installed, or to move into the retracted position to unlock the door;

a tail of the thumbturn coupling the thumbturn to the retract slide; and a channel formed in the retract slide into which an end of the thumbturn tail resides throughout all positions between retracted and projected of the bolt;

wherein when the bolt is projected, the locking catch is forced to extend out of the slot at a top, bottom, or side of the bolt;

wherein when the bolt retracts from the projected position, the locking catch withdraws into the slot so that it can clear a strike plate aperture and a scalp plate aperture;

wherein when the bolt is fully projected, the thumbturn tail is placed in opposition to a forward side of the channel;

wherein when an attempt is made to card the lockset, the thumbturn tail resists the attempt by counteracting pressure from a forward side of the channel to the thumbturn tail.

2. The lockset of claim 1, wherein:

the locking catch is an ear, a tab and/or a hook; and the lever is pivotally mounted to the bolt.

3. The lockset of claim 1, wherein:

the lockset is a mortise lockset; and wherein when the bolt is projected into a door frame or another door that provides a complementary recess for the locking catch, the locking catch extends into the complementary recess and, when a blunt impact force is exerted against the lockset to force the bolt to retract, the locking catch presses against a strike plate of the door frame or other door, thereby preventing retraction of the bolt.

4. The lockset of claim 1, wherein the lockset further comprises:

stationary posts that are mounted within the mortise body and that are stationary with respect to the mortise body;

wherein the lever has an edge, and the edge has a curvingly contoured section that cams against the stationary posts to lift and lower the lever between a withdrawn position where the locking catch is withdrawn into the bolt slot and a lockingly engaged position in which the locking catch extends out of the bolt slot.

5. The lockset of claim 1, wherein one or more cams are used to control the movement of the locking catch relative to the bolt and no spring is used to bias the lever or the locking catch.

6. The lockset of claim 1, wherein the channel has left and right sides whose upper portions diverge from a low midpoint on the retract slide to a top of the retract slide, and whose lower portions diverge from the low midpoint on the retract slide to a bottom of the retract slide;

wherein when the bolt is projected, the thumbturn tail is adjacent to the lower portion of a frontmost side, which is either the left side or the right side, closest to the bolt;

wherein a blunt force against the lockset to force the bolt to retract is impeded by the thumbturn tail against the lower portion of the frontmost side.

7. A lockset for a sliding door or a double door, the lockset comprising:

a lock body with a cam post and a scalp plate;

a bolt movable between retracted and projected positions with respect to the lock body;

a catch incorporated into or carried by a lever that is at least partially housed within the bolt and that, when the bolt approaches the projected position, automatically extends out of the bolt to lockingly engage a door frame or an opposite door of a sliding double door; and a contour along the lever, the contour comprising a glide edge segment and a first convex section forward of a concave section which itself is forward of a second convex section, wherein:

as the bolt is just beginning to retract from the projected position, the first convex section cams against the cam post, forcing a withdrawal of the catch from its lockingly engaged position;

as the bolt retracts further, the glide edge segment comes into contact with an upwardly facing edge of a scalp plate aperture, which supports the catch from drooping due to gravity; and as the bolt retracts even further, the glide edge segment retreats behind the scalp plate aperture and comes into contact with the cam post, so that the cam post replaces the upwardly facing edge of the scalp plate aperture as a support for the catch to prevent it from drooping low enough to potentially cause the lever to jam against the scalp plate when an attempt is made to project the bolt;

as the bolt projects into a bolt receptacle of a door frame or opposite door, the concave section and/or the second convex section cams against the cam post, forcing the catch into locking engagement with the door frame or opposite door.

8. The lockset of claim 7, further comprising:

a recessed linear section of the lever that rests upon and is long enough to bridge both the scalp plate and a strike plate when the bolt is in the projected position and is deep enough to enable the catch to lockingly engage a doorframe or an opposite door of a double door.

9. A mortise lockset for a sliding door or a double door, the mortise lockset comprising:

a mortise body;

a thumbturn;

a cam post;

a bolt with a slot; and a lever incorporating or carrying a catch configured for movement between an inactive position withdrawn into the bolt slot and an active position extending out of the bolt slot and into a complementary aperture of a door frame or of a second door;

a retract slide that carries the bolt between the retracted and projected positions and that is operatively connected to the thumbturn;

a tail of the thumbturn coupling the thumbturn to the retract slide; and a channel formed in the retract slide into which an end of the thumbturn tail resides throughout all positions between retracted and projected of the bolt, wherein:

the thumbturn, when operated, forces the retract slide to move into the projected position to lock a door in which the lockset is installed, or to move into the retracted position to unlock the door;

when the bolt is fully projected, the thumbturn tail end is placed in opposition to a forward side of the channel; and when a blunt force attack is made against the lockset to force the fully projected bolt to retract, the attack is impeded by the thumbturn tail end against a wall of the channel.

10. The mortise lockset of claim 9, wherein the lever is not spring biased into a catch-withdrawing or catch-extending position with respect to the bolt.

11. The mortise lockset of claim 9, wherein an edge of the lever comprises a first convex camming contact region that is configured to cam against the cam post as the bolt, when fully projected, begins to be retracted, creating a camming action that lifts the catch up into a withdrawn position within the bolt, clearing a strike plate of a door frame or second door that provides a bolt and catch receptacle for receiving the bolt and the catch.

12. The mortise lockset of claim 11, wherein the lever edge comprises a second convex camming contact region and a concave span between the first and second convex camming contact regions;

wherein when the bolt is being projected and after it has cleared the strike plate, the concave span and/or the second convex camming contact region cams against the cam post, forcing the catch to extend out of the bolt slot and into the bolt and catch receptacle.

13. The mortise lockset of claim 11, wherein the lever edge comprises a recess forward of the first convex camming contact region that extends far enough to span a scalp plate of the mortise lockset and the strike plate of a door frame or second door when the door or doors are closed.

14. The mortise lockset of claim 13, wherein the lever edge comprises a glide edge segment that is configured to ride across a lower edge of the scalp plate of the mortise lockset at least part of the bolt's travel between retracted and projected positions.

15. The mortise lockset of claim 14, wherein:

the glide edge segment includes a rearmost glide edge point; and movement of the bolt between retracted and extended positions defines a travel profile for the rearmost glide section point.

16. The mortise lockset of claim 15, wherein the travel profile, generated from a transition from a retracted bolt to a projected bolt, comprises a substantially linear first section, a substantially linear second section elevated above the first section, and a third section that descends from the second section.

17. The mortise lockset of claim 16, wherein the first section of the travel profile delineates the position of the rearmost glide edge point as the bolt travels from a position at or proximate its most retracted position to a position in which a leading glide edge point is proximate to the strike plate of a door frame or corresponding double door.

18. The mortise lockset of claim 16, wherein the second section of the travel profile corresponds to the position of the rearmost glide edge point as the bolt traverses the strike plate of the door frame or corresponding double door.

19. The mortise lockset of claim 16, wherein the travel profile includes a curved fourth section intermediate the first and second sections reflecting the camming action of the lever's edge against the cam post to raise the catch farther up into the bolt slot to ensure that the bolt clears the strike plate as the bolt continues to travel toward a completely extended position.

20. The mortise lockset of claim 16, wherein the third section of the travel profile is an elliptical section whose downward steepness illustrates the sharp downward turn that the catch makes very shortly after the rearmost glide edge point clears the strike plate.

* * * * *